(12) United States Patent
Sun et al.

(10) Patent No.: US 7,975,105 B1
(45) Date of Patent: Jul. 5, 2011

(54) SOLID STATE STORAGE DEVICES WITH CHANGEABLE CAPACITY

(76) Inventors: Yingju Sun, Cupertino, CA (US); Joe Zheng, Cupertino, CA (US)

( * ) Notice: Subject to any disclaimer, the term of this patent is extended or adjusted under 35 U.S.C. 154(b) by 687 days.

(21) Appl. No.: 11/949,748

(22) Filed: Dec. 3, 2007

(51) Int. Cl.
*G06F 12/00* (2006.01)
(52) U.S. Cl. .. 711/115; 711/103; 711/112; 711/E12.001
(58) Field of Classification Search .................... 710/74, 710/62, 72, 313; 711/103, 115, 112, E12.001, 711/114; 739/131; 713/2
See application file for complete search history.

(56) References Cited

U.S. PATENT DOCUMENTS

| | | | |
|---|---|---|---|
| 6,249,838 B1* | 6/2001 | Kon | 711/103 |
| 7,555,582 B2* | 6/2009 | Lambert et al. | 710/74 |
| 7,771,215 B1* | 8/2010 | Ni et al. | 439/131 |
| 7,831,758 B2* | 11/2010 | Andersen | 710/313 |
| 2005/0160223 A1* | 7/2005 | Chen et al. | 711/115 |
| 2008/0215800 A1* | 9/2008 | Lee et al. | 711/103 |
| 2008/0256352 A1* | 10/2008 | Chow et al. | 713/2 |
| 2009/0063895 A1* | 3/2009 | Smith | 711/E12.008 |

OTHER PUBLICATIONS

•Seongcheol et al., NAND Flash-Based Disk Cache Using SLC/MLC Combined Flash Memory, International Workshop on Storage Network Architecture and Parallel I/Os (SNAPI), 2010 pp. 21-30.*
Taehee Cho et al "A dual-mode NAND flash memory: 1-Gb multi-level and high-performance 512-Mb single-level modes", IEEE Journal on Solid State Cirtuits, Aug. 2002, pp. 1700-1706.*
Li-Pin Chang, "Hybrid solid-state disks: Combining heterogeneous NAND flash in large SSDs" Asia and South Pacific Design Automation Conference, 2008, pp. 428-433.. ASPDAC 2008. Asia and South Pacific.*

* cited by examiner

*Primary Examiner* — Pierre-Michel Bataille
(74) *Attorney, Agent, or Firm* — Wuxi Sino IPs, Ltd.; Joe Zheng

(57) ABSTRACT

A reconfigurable type of flash memory-based storage device is disclosed. According to one aspect, a flash SSD comprises a data bridge and a plurality of flash memory cards. The data bridge includes necessary interfaces, a data buffer and a data management module to facilitate data exchange between a host and these flash memory cards. Each of the flash memory cards, such as an SD flash memory card, functions perfectly by itself. To facilitate the need of upgrading in terms of storage capacity, the SSD provides a plurality of slots to receive these flash memory cards As the storage capacity of the flash memory cards is increased over the time, so does the SSD by replacing only the flash memory cards.

20 Claims, 1 Drawing Sheet

SOLID STATE STORAGE DEVICES WITH CHANGEABLE CAPACITY

BACKGROUND OF THE INVENTION

1. Field of the Invention

The invention is generally related to the area of data storage devices. Particularly, the present invention is related to techniques for building up a flash-based solid state disk (SSD) with individual flash memory cards.

2. The Background of Related Art

A traditional hard disk device, sometimes also referred to as Hard Disk Drive (HDDs) has been around for many years. It records data by magnetizing a magnetic material in a pattern that represents the data. Data is read out by detecting the magnetization of the material. A typical HDD design includes a spindle which holds one or more flat circular disks called platters, onto which the data is recorded. The platters are made from a non-magnetic material, usually glass or aluminum, and are coated with a thin layer of magnetic material. Despite of these fine mechanical moving parts, the hard disks are almost every-where that requires a large storage capacity and read/write speed.

Flash memory is non-volatile, which means that it does not need power to maintain the information stored in the flash memory chip. In addition, flash memory offers fast read access times and better kinetic shock resistance than the hard disks. However, the high price of the flash memory in the past has prevented it from making significant inroads into large storage devices.

With the prices of flash memory continue to decline dramatically over the recent years while the capacities continue to increase, flash-based data storage device, also referred to as Solid-state drive (or SSD) has gained tremendous attentions recently, due to the fact that they will provide relatively high storage capacities, as well as a very high degree of reliability and shock-resistance, especially for mobile or portable applications.

The capacity of the flash memory increases almost every month with the new technologies in place. A flash SSD designed upon the current available flash memories would soon become obsolete when flash memories with much higher capacity become available. For example, the current popular flash memories come in capacity of 1 GByte and 2 Gbyte. A typical SSD would employ 4 or 8 of these memories, resulting in 4 Gbytes to 16 Gbyte in storage capacity. When the flash memories are increased to the capacity of 16 GByte or 32 Gbyte, an SSD could be easily built with a capacity of 16 Gbytes to 256 Gbytes, without much difficulty.

In the past, computer users have kept changing their hard disks for the sake of storage capacity. With more and more media files captured, the users soon notice that their current hard disks are nearly full and start to look for hard disks with larger capacity. Because of the superior features in flash SSD, computer users may already start to adopt the flash SSD despite of relatively small capacity of current flash SSD. When the flash memories with large capacity come to reality, flash SSD of large capacity will become available. Solutions of not changing a disk but still increasing the storage capacity will be certainly welcome. Likewise, techniques of minimizing the costs of building up flash SSD are very much needed.

SUMMARY OF THE INVENTION

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

In general, the present invention pertains to a flash memory-based storage device. According to one aspect of the present invention, a flash SSD comprises a data bridge and a plurality of flash memory cards. The data bridge includes necessary interfaces, a data buffer and a data management module to facilitate data exchange between a host and these flash memory cards. Each of the flash memory cards, such as an SD flash memory card, functions perfectly by itself. To facilitate the need of upgrading in terms of storage capacity, the SSD provides a plurality of slots to receive these flash memory cards as the storage capacity of the flash memory cards is increased over the time, so does the SSD by replacing only the flash memory cards.

According to another aspect of the present invention, a manufacturer of the flash SSD takes advantage of the flash memory cards that have already been tested and verified by a supplier. Because flash memory cards suitable for such a flash SSD must function perfectly by themselves, a manufacturer of such flash memory cards has to undertake all the necessary procedures to test and verify the flash memory cards before releasing them to the market as these flash memory cards may be used in devices other than the flash SSDs, such as digital cameras or computers. In the end, the manufacturer of the flash SSD does not have to incur the costs that would otherwise have to be spent in testing or verifying the prior art SSD.

The present invention provides a mechanism that allows a user to increase the storage capacity of a flash SSD without replacing the flash SSD. In one aspect, the mechanism includes a utility to allow the user to move data around, for example, from one memory card to another memory card, before replacing a memory card.

The flash memory cores in each of the memory cards may include two types of flash memory, one being used to retain data that is frequently used or updated and the other being used to retain data that is less frequently used or updated. As a result, the characteristics of the two different flash structures are being best utilized.

The present invention may be implemented in many forms, including a device, a system, a method, an integrated circuit, or a part of a system. According to one embodiment, the present invention is a solid state storage device that comprises a main board including at least a host interface, a buffer, a data management module and a plurality of card interfaces; a number of flash memory cards removably coupled to the main board via the card interfaces, wherein each of the flash memory cards independently works with a device that provides a slot to receive the each of the flash memory cards for data exchange, wherein a storage capacity of the flash-based storage device is upgraded without being changed when one of the flash memory cards is replaced. One of the important objects, features and advantages in the present invention is that the flash memory cards are those commonly used for other devices. In other words, a user may reconfigure a flash SSD suitable to his/her own uses.

According to another embodiment, the present invention is a solid state storage device that comprises a data bus; an integrated circuit designed to provide functions of a host interface, a buffer, a data management module and a plurality of card interfaces; a number of flash memory cards coupled to the integrated circuit via the card interfaces, wherein each of the flash memory cards independently works with a device that provides a slot to receive the each of the flash memory cards for data exchange; and wherein the data management module is configured to distribute data to be stored among some or all of the flash memory cards and reassemble stored data from some or all of the flash memory cards, and wherein each of the flash memory cards is removable from the flash-based storage device.

According to still another embodiment, the present invention is a flash-based storage device that comprises: a housing with a plurality of openings; a main board, housed in the housing, including at least a host interface, a buffer, a data management module and a plurality of card interfaces; a number of flash memory cards, each of the openings provided to receive one of the flash memory cards that are coupled to the main board via the card interfaces, wherein each of the flash memory cards works independently with a device that provides a slot to receive the each of the flash memory cards for data exchange; and wherein a storage capacity of the flash-based storage device is upgradeable by replacing any one of the flash memory cards.

Objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE PREFERRED EMBODIMENTS

The detailed description of the invention is presented largely in terms of procedures in terms of procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth in order to provide a thorough understanding of the present invention. However, it will become obvious to those skilled in the art that the present invention may be practiced without these specific details. In other instances, well known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams, if any, representing one or more embodiments of the invention do not inherently indicate any particular order nor imply any limitations in the invention.

Figure 1:
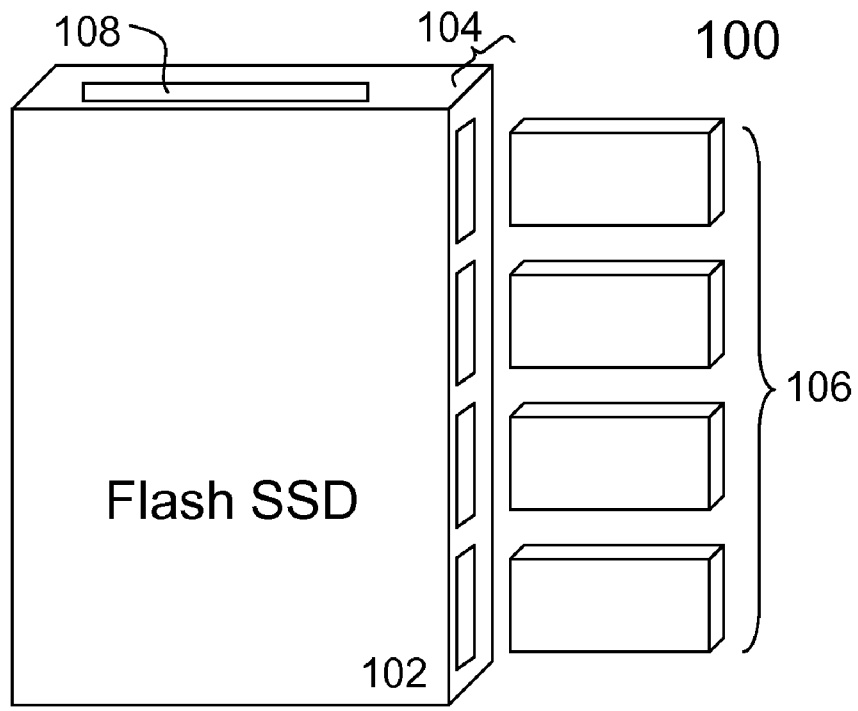
FIG. 1 shows an exemplary configuration of a flash memory-based storage device according to one embodiment of the present invention.

Referring now to the drawings, in which like numerals refer to like parts throughout the several views. FIG. 1 shows an exemplary configuration of a flash memory-based storage device 100. The device 100 includes a housing or case 102 with a plurality of openings 104 to receive flash-based memory cards 106. Similar to a traditional hard disk, the device 100 also includes one or more interfaces, one of which is for receiving power to energize the device 100 and another one 108 of which is for interfacing with a host (not shown). Depending on where the device 100 is used, the host may be a computer, a camcorder or a device that is traditionally equipped with a traditional hard disk. In other words, such a hard disk can be readily replaced by the device 100. Through the interface 108, the device 100 may communicate with the host to exchange data therebetween.

A prior art flash SSD includes an array of flash memories mounted on a board (e.g., PCB), and one or more controllers to manage these flash memories. If one of the flash memories goes wrong, there may be a chance that the entire SSD may become useless. Significantly different from the prior art SSD, the device 100 itself does not include any flash memories mounted on its board. Instead, the device 100 is provided with a number of slots to receive memory cards 106 via the openings 104.

As used herein, a memory card is one of those commonly used in digital cameras or for porting data, and commercially available in an electronics or computer store. Examples of the memory card include, but may not be limited to, USB (Universal Serial Bus) flash drives, Secure Digital (SD) cards, Multi-Media Cards (MMC), SmartMedia cards, and CompactFlash cards (CF card). Users may use such cards to store digital photos or personal data. Most of these memory cards have different interfaces and form factors but similar working principles. Usually, such a memory card includes a controller with a designated interface and one or more flash memory chips. The controller manages data exchanging with a host via the designated interface, and is also responsible for error correction and wearing/defect management.

There are a lot of companies producing such memory cards. For example, Sandisk Corporation in Milpitas of California in US has almost all types of memory cards in the market for different applications. Form silicon wafer to the final memory cards, there are different stages of tests to ensure that the memory cards are in good quality. For example, a card manufacturer purchases parts, such as controllers and flash memories, from other parties. After assembling the parts into the final product, the card manufacturer has to undertake the burden to test extensively each of the cards before releasing the cards to the market. One of the objects, features and advantages in the present invention is to allow a manufacturer of SSD per the present invention to take advantages of the memory cards that have already been extensively tested. As a result, a flash SSD manufacturer employing the present invention does not have to incur the costs and labors to test SSDs as the SSDs may use memory cards from others.

Figure 2:
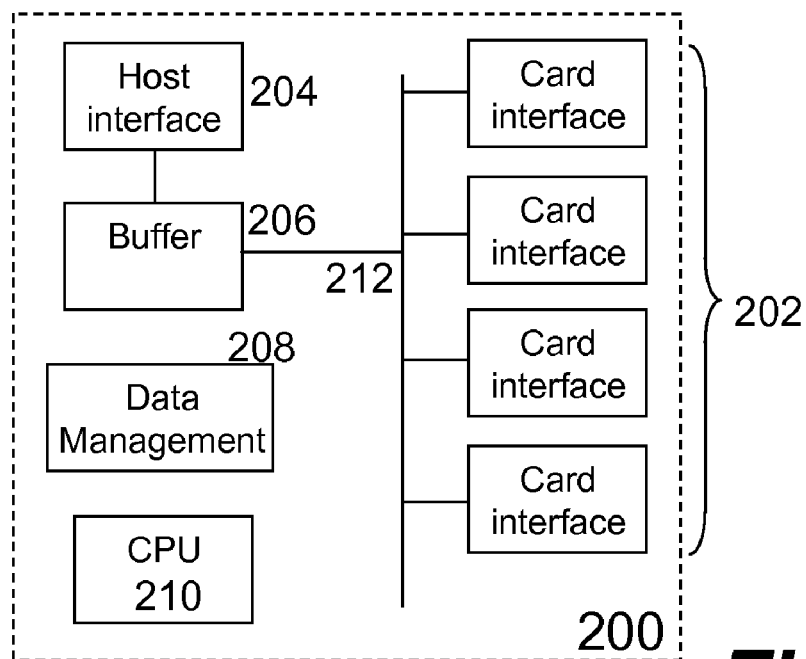
FIG. 2, there shows a block functional diagram of a flash SSD according to one embodiment of the present invention.

Referring now to FIG. 2, there shows a block functional diagram of a flash SSD 200 according to one embodiment of the present invention. The SSD 200 may be used to internally in the device 100 of FIG. 1. As shown in the figure, the SSD 200 includes an array of card interfaces 202, a host interface 204, a buffer 206, a data management unit 208 and a CPU 210. Each of the card interfaces 202 is designed to communicate with a memory card. In other words, if the device 200 is designed to receive memory cards with SD interfaces, each of the card interfaces 202 is thus designed in accordance with the SD interface. In operation, when such a memory card is inserted into the device 100 via one of the openings 104, a corresponding card interface shall supply power to and recognize the memory card for data communication.

According to one embodiment, the card interfaces 202 are designed to be compliant with multiple interfaces so that different memory cards may be used to work with the device 200. However, since different memory cards come in different form factors, the opening 104 of FIG. 4 are designed to be flexible enough to accommodate the commonly used memory cards.

According to another embodiment, the card interfaces 202 are designed to be compliant with one particular interface with one special form factor. The specialties in this embodiment require a manufacturer of memory cards to supply such memory cards complying with special requirements imposed by a flash SSD manufacturer so that a final SSD works in accordance with the specification by the SSD manufacturer. In general, a flash SSD has higher standards than a memory card does because there is a possibility that a flash SSD is used to boot an operating system in which case the read speed, the write speed, the error correction capability, and defect/wearing control capability must be satisfactory to the standards set for a flash SSD.

The host interface is provided to facilitate the data exchange between a host and the device 100 in accordance with a protocol (e.g., IDE, SATA-I, SATA-II, SCSI or USB3.0). For example, when the device 100 is connected to a host computer that is provided with an IDE interface, the host interface 204 is designed to work with the IDE interface to facilitate the data communication between the host computer and the device 200.

The buffer 206 is provided to buffer data being exchanged between the host and the device 100. In one operation, the buffer 206 buffers data to be written into one or more of the memory cards. In another operation, the buffer 206 provides a space to reassemble data respectively stored in more than one memory cards.

The data management 208 is provided to manage how data is to be stored among the array of the inserted memory cards 106 via the card interfaces 202. Depending on implementation, the data management 208 may be implemented in different ways. In one embodiment, the data management 208 is designed to communicate with the controllers in the memory cards 202 to understand the status of each of the memory cards. For example, one memory card may be newer than other memory cards, thus the data management 208 may cause the newer memory card to be used more frequently than others. The data management 208 may also access a defect map of the flash memory used in a memory card via the controller therein.

In another case, the data management 208 notifies which one of the memory cards may soon reach its end of working life so that a replacement may be brought in. In still another case, the data management 208 is configured to move data stored in one memory card to another one, for example, to prepare for a replacement card. A utility application may be included in one of the memory cards and activated to allow a user to cause the device 200 to move data stored in one memory card therein to another memory card. The utility application may include a graphic interface to show the capacity and usage pf each of the memory cards. As NAND flash memory has a limited lifespan for read/write process, the graphic interface may also show possible remaining lifespan so that the user knows when to replace a memory card.

In still another case, the data management 208 manages data integrity that is important if one of the memory cards storing some data is taken away, becomes defective, or loses good connection or is replaced with another memory card. A message will be caused by the data management 208 to display to the user that the needed data is in the memory card that is current not present.

In still another case, the data management 208 ensures that data is evenly distributed among the memory cards 106 or creates a redundant copy to prevent possible loss of data. In yet another case, the data management 208 is configured to ensure frequently used or updated data is to be stored in a particular structure of the flash memories in the memory cards. Technically, there are currently two types of flash memory structures, one is called Single-Level Cell (SLC) flash memory, and the other is called Multi-Level Cell (MLC) flash memory. SLC and MLC are both NAND-based non-volatile memory technologies. Multi-Level Cell (MLC) NAND and Single-Level Cell (SLC) NAND offer capabilities that serve two very different types of applications—those requiring high performance at an attractive cost-per-bit and those seeking even higher performance over time, that are less cost-sensitive. In one embodiment, some of flash memories in one memory card or some of the memory cards include SLC flash memories and the rest are MLC flash memories. Thus the data management 208 is configured to ensure frequently used/updated data such as those for an operating system (OS) is stored in the SLC flash memories and other less frequently updated data, such as those video or image data, is stored in the MLC flash memories.

CPU 210 is provided to synchronize operations of the blocks in the SSD 200 and programmed to perform many of the functions as described herein. In one embodiment, a set of instructions (firmware) is provided and causes the CPU 210 to act as desired. The CPU 210 may be a general purpose microprocessor (e.g., ARM power-efficient RISC processor) or specially designed microprocessor.

In operation, when data from a host is to be stored into the memory cards, the data is first put into the butter 206. Under the synchronized control of the data management 208 and the CPU 210, the buffered data is distributed via the data bus 212 to one or more designated memory cards for store. It should be noted that a write speed of the SSD 200 is typically a lot faster than that of a single memory card. For example, the write speed of four memory card is N and the data to be stored therein is evenly distributed among the four memory cards. The data management 208 is configured to parse the data into four parts, each is to be written into one of the four memory cards. As four parts are being written into the four memory cards at the same time, thus the write speed of the SSD 200 is operationally 4×N (four times faster). The read speed of the SSD 200 shows the similar feature as stored data is being read out simultaneously from four memory cards. It may be understood to those skilled in the art that the bus 212 may be expanded to accommodate more of the memory cards, accordingly, the equivalent read or write speed of the SSD 200 may be further increased.

The present invention provides one mechanism for a user to upgrade a flash SSD by replacing one or more existing memory cards or adding some new ones, without changing the SSD itself. The mechanism also allows a manufacturer of the SSD to take advantages of other manufacturers producing the memory cards by shifting the testing/verifying burdens. Further, the present invention allows a manufacturer of the SSD not to keep a large quantity of flash memories in inventory by shifting such inventory directly to the end users, each users determining what they want for their SSD in terms of capacity or interfaces.

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. While the embodiments discussed herein may appear to include some limitations as to the presentation of the information units, in terms of the format and arrangement, the invention has applicability well beyond such embodiment, which can be appreciated by those skilled in the art. Accordingly, the scope of the present invention is defined by the appended claims rather than the foregoing description of embodiments.

The invention claimed is:

1. A flash-based storage device comprising:
an enclosure including a plurality of openings;
a main board, housed in the enclosure, including at least a host interface, a buffer, a data management module and a plurality of card interfaces;
a number of mechanisms respectively coupled to the card interfaces, each of the mechanisms directing towards one of the openings, each of flash memory cards being inserted into one of the mechanisms through one of the openings and coupled to one of the card interfaces, wherein the each of the flash memory cards independently works with a device that provides a slot to receive the each of the flash memory cards for data exchange, wherein the data management module is configured to manage how to store data on the flash memory cards when there are at least two of the flash memory cards inserted respectively in the mechanisms, and indicates so when one of the at least two of the flash memory cards holds some of the data but becomes no longer available, and wherein the host interface facilitates data exchange between the flash-based storage device and a host device, the buffer is provided to buffer data being exchanged between the host device and the flash-based storage device, data received from the host device is first buffered in the buffer before the buffered data is distributed among the inserted flash memory cards; and
wherein a storage capacity of the flash-based storage device is upgraded when one of the flash memory cards is replaced.

2. The flash-based storage device as recited in claim 1, wherein at least one of the openings is designed to be flexible enough to accommodate commonly used memory cards in different form factors.

3. The flash-based storage device as recited in claim 1, wherein the buffer provides a space to reassemble retrieved data respectively stored in some or all of the flash memory cards before the retrieved data is transported from the flash-based storage device to the host device via the host interface.

4. The flash-based storage device as recited in claim 3, wherein the data management module is configured to remember which of the at least two flash memory cards is used to store at least part of the data.

5. The flash-based storage device as recited in claim 1, wherein a utility application is included in one of the flash memory cards and activated to allow a user to cause the flash-based storage device to move data stored in one of the flash memory cards to another one of the flash memory cards, the utility application provides a graphic interface to show the capacity and usage of each of the memory cards.

6. The flash-based storage device as recited in claim 1, wherein each of the card interfaces is designed to comply with a standard that allows one of the flash memory cards to work with other than the flash-based storage device.

7. The flash-based storage device as recited in claim 6, wherein each of the memory cards is one or more of a USB (Universal Serial Bus) flash drive, a Secure Digital (SD) cards, a Multi-Media Card (MMC), a SmartMedia card, and a CompactFlash card (CF card) or a commonly used flash memory card.

8. The flash-based storage device as recited in claim 1, wherein the data management module is configured to perform one or more of operations of:
notifying which one of the at least two flash memory cards soon reaches an end of working life so that a replacement is necessary;
moving data stored in a relatively old flash memory card to another flash memory card to prepare for a replacement of the relatively old flash memory card, wherein the relatively old flash memory card is one of the at least two flash memory cards; and
ensuring that data is evenly distributed among the at least two flash memory cards or creating a redundant copy to prevent possible loss of the data.

9. The flash-based storage device as recited in claim 1, wherein the data management module is configured to ensure that frequently updated data is to be stored in Single-Level Cell (SLC) flash core and less frequently updated data is to be stored in Multi-Level Cell (MLC) flash core when any of the at least two flash memory cards is made of MLC flash cores.

10. A flash-based storage device comprising:
a case designed in shape substantially similar to a traditional hard disk drive so that the flash-based storage device is used to replace the traditional hard disk drive to work directly with a host, wherein the case with a plurality of openings includes a data bus and an integrated circuit designed to provide functions of a host interface, a buffer, a data management module and a plurality of card interfaces, the case further includes a plurality of identical slots, each directing towards one of the openings, a number of flash memory cards in identical shape are inserted respectively into the identical slots through the openings so that the flash memory cards are coupled to the integrated circuit via the card interfaces, wherein each of the flash memory cards independently works with a device for storage; and
the data management module is configured to buffer data from the host in the buffer and distribute the buffered data to be stored among some or all of the flash memory cards and reassemble in the buffer stored data from some or all of the flash memory cards to be read by the host, and wherein each of the flash memory cards is removable from the flash-based storage device.

11. The flash-based storage device as recited in claim 10, wherein each of the flash memory cards comes in a form factor that is suitable for a commonly used portable device, and wherein a manufacturer of the flash-based storage device produces such a flash-based storage device without having to test or verify storage functions of the flash-based storage device but provides a flexibility of increasing or decreasing storage capacity of the flash-based storage device by a user any time.

12. The flash-based storage device as recited in claim 11, wherein the data management module is configured to move data stored in a relatively old flash memory card to another flash memory card before the relatively old flash memory card is replaced with a new flash memory card.

13. The flash-based storage device as recited in claim 12, wherein the data management module is configured to ensure the new flash memory card to be used more frequently than other of the flash memory cards that have not been replaced.

14. A flash-based storage device comprising:
a main board including at least a host interface, a buffer, a processor, a data management module and a plurality of card interfaces;
a housing, to house the main board, with a plurality of openings on one side of the housings to receive a number of flash memory cards inserted externally, the flash memory cards being coupled to the main board via the card interfaces respectively, wherein each of the flash memory cards works independently with a device for storage; and
wherein the host interface facilitates the flash-based storage device to work directly with a host device to store data of an operating system (OS), the data management module configured to ensure that the data stored in some or all of the flash memory cards is reassembled in the buffer before booting the host from the flash-based storage device, an overall storage capacity of the flash-based storage device is upgradeable anytime by replacing any one of the flash memory cards.

15. The flash-based storage device as recited in claim 14, wherein the capacity of the flash-based storage device is readily increased by adding new memory cards of larger capacity without changing the flash-based storage device.

16. The flash-based storage device as recited in claim 15, wherein the data management module is configured to perform one or more of operations of:
notifying which one of the flash memory cards soon reaches an end of working life so that a replacement is necessary;
moving data stored in a relatively old flash memory card to another flash memory card to prepare for a replacement of the relatively old flash memory card, wherein the relatively old flash memory card is one of the at least two flash memory cards; and
creating a redundant copy to prevent possible loss of the data.

17. The flash-based storage device as recited in claim 15, wherein the data management module is caused to provide a graphic interface to show respective statuses of the memory cards.

18. The flash-based storage device as recited in claim 15, wherein the processor is configured to determine characteristics of other data to be stored, when the other data is frequently used or updated, the other data is caused to be retained in a first type of flash memory in some or all of the flash memory cards, when the other data is less frequently updated, the data is caused to be retained in a second type of flash memory in some or all of the flash memory cards.

19. The flash-based storage device as recited in claim 18, wherein the other data that is frequently used or updated pertains to the operating system (OS), and the other data that is less frequently updated includes audio, image and video data.

20. The flash-based storage device as recited in claim 18, wherein the first type of flash memory is based on Single-Level Cell (SLC) flash core, and the second type of flash memory is based on Multi-Level Cell (MLC) flash cores.

* * * * *